(12) United States Patent
Hoekstra et al.

(10) Patent No.: US 10,075,704 B2
(45) Date of Patent: Sep. 11, 2018

(54) METHODS AND APPARATUS FOR GENERATING TEST AND OVERLAY PATTERNS IN IMAGE SENSORS

(71) Applicant: SEMICONDUCTOR COMPONENTS INDUSTRIES, LLC, Phoenix, AZ (US)

(72) Inventors: Cornelis Hoekstra, Corvallis, OR (US); Jeffery Beck, Corvallis, OR (US); Sergey Velichko, Boise, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 112 days.

(21) Appl. No.: 14/717,750

(22) Filed: May 20, 2015

(65) Prior Publication Data

US 2016/0345005 A1 Nov. 24, 2016

(51) Int. Cl.
*H04N 17/00* (2006.01)
*H04N 17/02* (2006.01)
*H04N 5/359* (2011.01)
*H04N 5/3745* (2011.01)
*H04N 5/374* (2011.01)

(52) U.S. Cl.
CPC ......... *H04N 17/002* (2013.01); *H04N 5/3592* (2013.01); *H04N 5/374* (2013.01); *H04N 5/3745* (2013.01)

(58) Field of Classification Search
CPC .... H04N 17/002; H04N 5/3592; H04N 5/374; H04N 5/3745
USPC ................................................ 348/187, 295
See application file for complete search history.

(56) References Cited

U.S. PATENT DOCUMENTS

| 5,900,623 | A | 5/1999 | Tsang et al. | |
|---|---|---|---|---|
| 7,804,052 | B2 | 9/2010 | Chinnaveerappan | |
| 8,730,330 | B2 * | 5/2014 | Solhusvik | H04N 5/335 348/187 |
| 8,803,979 | B2 * | 8/2014 | Solhusvik | H04N 5/378 348/177 |

(Continued)

OTHER PUBLICATIONS

Jeffrey Beck et al., U.S. Appl. No. 14/231,694, filed Mar. 31, 2014.

*Primary Examiner* — Jefferey F Harold
*Assistant Examiner* — Omer Khalid
(74) *Attorney, Agent, or Firm* — Treyz Law Group, P.C.; Joseph F. Guihan

(57) ABSTRACT

An imaging system may include an image sensor having a pixel array. The pixel array may receive test signals from multiplexers located at the top or bottom of each column of the array. Test signals may be provided to each column based on a predefined test pattern. In some arrangements, pixel array photodiodes may receive test signals through an anti-blooming transistor while the anti-blooming transistor is on. In other arrangements, dark current of photodiodes in the pixel array may be modulated by voltages applied to the drain of an anti-blooming transistor while the anti-blooming transistor is off. In other arrangements, pixel array photodiodes may receive test signals through a reset transistor. Arbitrary test patterns may be applied to determine photodiode or floating diffusion node leakage and incorrect pixel control voltages. Arbitrary patterns may also be superimposed on light-based image data in the manner of a watermark.

16 Claims, 6 Drawing Sheets

(56) References Cited

U.S. PATENT DOCUMENTS

| | | | |
|---|---|---|---|
| 2013/0293724 A1* | 11/2013 | Martinussen | H04N 17/002 348/175 |
| 2014/0094993 A1 | 4/2014 | Johnson | |
| 2014/0226027 A1 | 8/2014 | Johansson et al. | |
| 2014/0247366 A1 | 9/2014 | Solhusvik et al. | |
| 2015/0009341 A1 | 1/2015 | Pahr | |
| 2015/0009375 A1* | 1/2015 | Agranov | H04N 5/35572 348/295 |
| 2015/0281684 A1* | 10/2015 | Beck | H04N 17/045 348/175 |

* cited by examiner

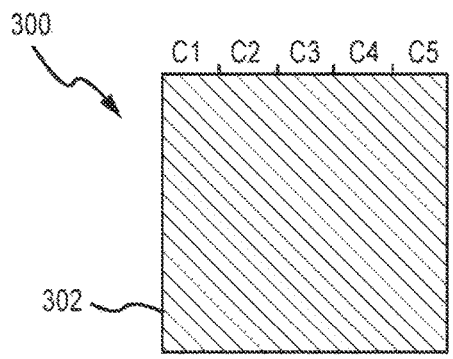
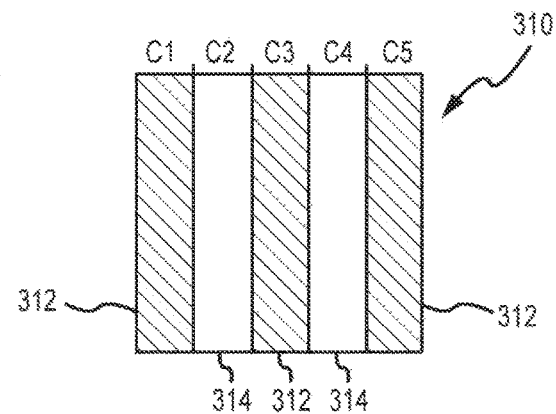
FIG.3A          FIG.3B
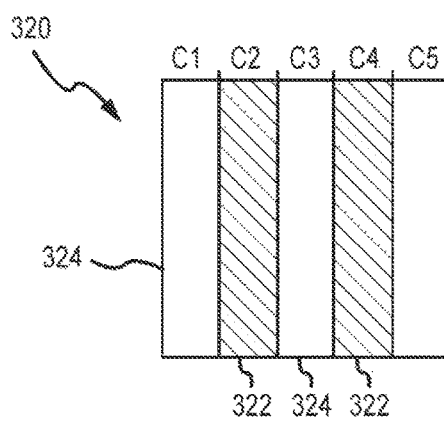
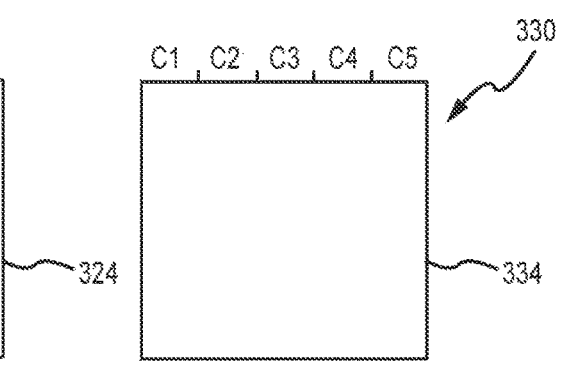
FIG.3C          FIG.3D

US 10,075,704 B2

METHODS AND APPARATUS FOR GENERATING TEST AND OVERLAY PATTERNS IN IMAGE SENSORS

BACKGROUND

This relates generally to image sensors, and more specifically, to methods and circuitry for directly injecting test patterns into individual photodiodes within a pixel array to test the integrity of the components in the pixel array.

Image sensors are commonly used in electronic devices such as cellular telephones, cameras, and computers to capture images. Conventional image sensors are fabricated on a semiconductor substrate using complementary metal-oxide-semiconductor (CMOS) technology or charge-coupled device (CCD) technology. The image sensors may include an array of image sensor pixels each of which includes a photodiode and other operational circuitry such as transistors formed in the substrate.

Capturing images using a CMOS image sensor often involves using an electronic rolling shutter (ERS) operation to successively reset, integrate, and read out single rows of image pixels on the image sensor. In the traditional ERS operation, row reset and readout are typically performed for a single row at a given time. Row reset refers to an operation which prepares a pixel for light capture by resetting a light generated charge accumulating device (e.g., photodiode) to an uncharged state. Row readout refers to an operation on image pixels that have been exposed to light for a desired duration of time, which involves sampling the pixel columns of a given row and converting a value related to the amount of charge accumulated by the pixel during exposure to a digital signal.

Over the lifetime of an electronic device, image sensors in the electronic device may be prone to failure. Conventional image sensors are sometimes provided with methods for testing the functionality of the image sensor when the electronic device is in stand-by mode. However, failure or error may occur during active operation of the device or may otherwise be undetectable during stand-by mode.

It would therefore be desirable to be able to provide improved image sensors that are capable of verifying the functionality of the imaging system during both stand-by mode and during active operation.

BRIEF DESCRIPTION OF THE DRAWINGS

FIG. 3A-3D are diagrams of illustrative test patterns that may be injected into an image pixel array using circuitry of the type shown in FIGS. 2, 4 and 5 in accordance with an embodiment of the present invention.

DETAILED DESCRIPTION

Figure 1:
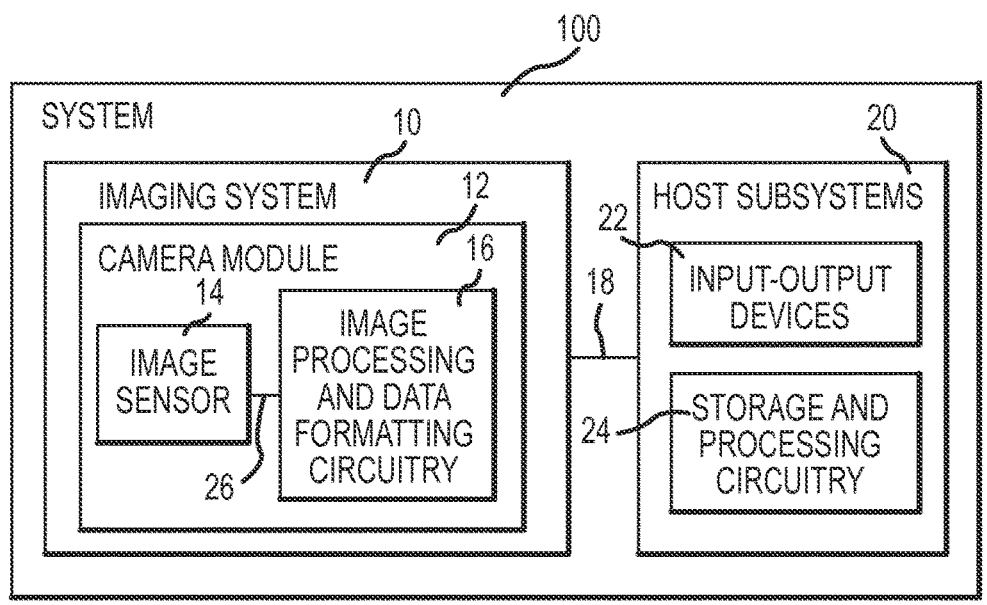
FIG. 1 is a diagram of an illustrative electronic device having an image sensor in accordance with an embodiment of the present invention.

Imaging systems having digital camera modules are widely used in electronic devices such as digital cameras, computers, cellular telephones, and other electronic devices. A digital camera module may include one or more image sensors that gather incoming light to capture an image.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc. In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may activate braking, active steering, or other active collision avoidance measures. A vehicle safety system may use continuously captured images from an imaging system having a digital camera module to help avoid collisions with objects (e.g., other automobiles or other environmental objects), to help avoid unintended drifting (e.g., crossing lane markers) or to otherwise assist in the safe operation of a vehicle during any normal operation mode of the vehicle.

Vehicle safety standards may require that the proper operation of any component of a vehicle safety system (including imaging system components) be verified before, during, and/or after operation of the vehicle. Verification operations for imaging system components may be performed by an imaging system prior to and/or after operation of a vehicle (e.g., upon startup and/or shutdown of the imaging system). In these verification operations, concurrent operation of the imaging system may not be required. However, it may be desirable to continuously monitor the status of imaging system components during operation of the imaging system, particularly in situations in which vehicle safety may be influenced by the quality of imaging data provided by the imaging system. Imaging systems may be provided having this type of on-the-fly (e.g., real-time) verification capability.

Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels). An image sensor may include verification circuitry for verifying the correct operation of the image sensor. For example, in situations in which images captured by the image sensors are used as input to an active control system for a vehicle, verification circuitry in the image sensor may be configured to generate verification image data and compare the verification image data with an expected result so that incorrect image sensor data is not input into the active control system.

In some configurations, verification image data may be compared with a predetermined standard stored in the imaging system, generated by the imaging system during operation, or stored on additional circuitry that is external to the imaging system. The predetermined standard may be a mathematically determined threshold, may sometimes be referred to as a "golden" standard image, may be captured during manufacturing of the imaging system or at another suitable time (e.g., during startup or shutdown of the imaging system), and may include one or more mathematically or experimentally determined ranges to which verification image data may be compared.

In other configurations, verification image data may include a pattern or sequence of data values. The pattern or sequence of data values from the verification image data may be compared with a predetermined pattern or sequence of data values. For example, verification image data may include a frame number that has been digitally encoded into the image. The verification image data may be compared with a known frame number to verify that the frame number encoded into the image matches the known frame number. Other patterns or sequences of data values may be encoded into the image data to be used as verification image data. Digitally encoding the frame count into the image data is sometimes described herein as an example.

Based on the result of the comparison of the verification image data with the predetermined standard or predetermined pattern, an imaging system may be disabled (e.g., if the result is outside the predetermined range or if the result does not match the known frame number) or may continue to operate normally (e.g., if the result is within the predetermined range or if the result matches the known frame number). In some arrangements, the imaging system may remain in operation but an indicator may be presented to users to inform the users that the imaging system needs further inspection and/or repair (e.g., the imaging system may present a "check imaging system" indication when the results of verification operations indicate a potential problem in the operation of the imaging system).

FIG. 1 is a diagram of an illustrative imaging and response system including an imaging system that uses an image sensor to capture images. System 100 of FIG. 1 may be a vehicle safety system (e.g., an active braking system or other vehicle safety system), may be a surveillance system, or may be an electronic device such as a camera, a cellular telephone, a video camera, or other electronic device that captures digital image data.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses. The lenses in camera module 12 may, as an example, include M*N individual lenses arranged in an M×N array. Individual image sensors 14 may be arranged in a corresponding M×N image sensor array (as an example). The values of M and N may each be equal to or greater than one, may each be equal to or greater than two, may exceed 10, or may have any other suitable values.

Each image sensor in camera module 12 may be identical or there may be different types of image sensors in a given image sensor array integrated circuit. Each image sensor may be a Video Graphics Array (VGA) sensor with a resolution of 480×640 image sensor pixels (as an example). Other arrangements of image sensor pixels may also be used for the image sensors if desired. For example, images sensors with greater than VGA resolution (e.g., high-definition image sensors), less than VGA resolution and/or image sensor arrays in which the image sensors are not all identical may be used.

During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from camera sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include an active control system that delivers control signals for controlling vehicle functions such as braking or steering to external devices. Host subsystem 20 may include processing software for detecting objects in images, detecting motion of objects between image frames, determining distances to objects in images, filtering or otherwise processing images provided by imaging system 10. Host subsystem 20 may include a warning system configured to disable imaging system 10 and/or generate a warning (e.g., a warning light on an automobile dashboard, an audible warning or other warning) in the event that verification image data associated with an image sensor indicates that the image sensor is not functioning properly.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

During operation of imaging system 10, camera module 12 may continuously capture and provide image frames to host subsystem 20. During image capture operations, verification circuitry associated with image sensor 14 may be occasionally operated (e.g., following each image frame capture, following every other image frame capture, following every fifth image frame capture, during a portion of an image frame capture, etc.). Images captured when verification circuitry is operated may include verification image data containing verification information. Verification image data may be provided to image processing circuitry 16 and/or storage and processing circuitry 24. Image processing circuitry 16 may be configured to compare the verification image data to a predetermined data set stored on image processing circuitry 16. Following the comparison, image processing circuitry 16 may send status information or other verification information to host subsystem 20.

Figure 2:
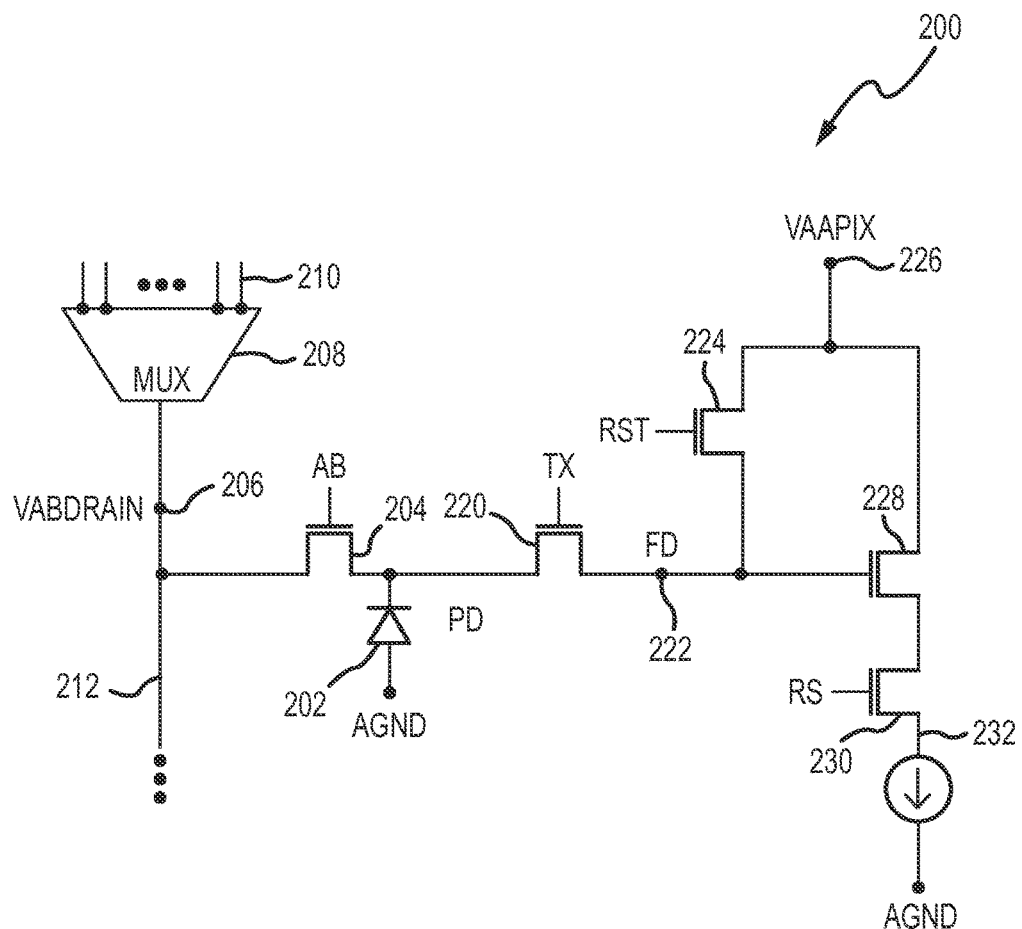
FIG. 2 is a diagram of an illustrative image pixel circuit with a photodiode that connects to a test signal line through a multiplexer through an anti-blooming transistor in accordance with an embodiment of the present invention.

FIG. 2 is a diagram of an illustrative image pixel circuit that may be used in image sensor 14. The illustrative pixel of FIG. 2 may include a photodiode that connects to a test signal line through a multiplexer through an anti-blooming transistor in accordance with an embodiment. As shown in FIG. 2, image pixel 200 may be part of a pixel array arranged in rows and columns and may include a photodiode (PD) 202, an anti-blooming transistor 204, a column multiplexer 208, a transfer transistor 220, a floating diffusion (FD) node 222, a reset transistor 224, a source follower transistor 228, a row select transistor 230, and a column output line 232. Floating diffusion node 222 may be coupled to photodiode 202 through transfer transistor 220. Source follower transistor 228 may have a drain terminal that is connected to a pixel voltage supply that generates a pixel voltage VAAPIX at pixel voltage node 226, a gate terminal that is connected to floating diffusion node 222, and a source terminal that is coupled to column output line 232 through row select transistor 230.

Column multiplexer 208 may receive test signals 210 from verification circuitry associated with image sensor 14 and may pass a selected test voltage of test voltages 210 to multiplexer output node 206 that is coupled to photodiode 202 through anti-blooming transistor 204. Multiplexer output node 206 may have a voltage VABDRAIN and may be connected to multiple pixels in a single column of the pixel array. Each row in the pixel array may be read out separately using an electronic rolling shutter methodology. Because each row is read out separately and each column can be individually controlled with column multiplexer 208, each pixel in the pixel array may receive a unique test signal.

During normal operation, anti-blooming transistor 204 may be kept off and column multiplexer 208 may select VABDRAIN to have the same voltage level as VAAPIX. The gate terminal of reset transistor 224 may receive a reset signal RST. The gate terminal of row select transistor 230 may be configured to receive a row select signal RS. The gate terminal of anti-blooming transistor 204 may receive a signal AB. During a test operation, signal AB may correspond to reset signal RST or it may be driven independently from the reset signal RST. VABDRAIN may be set to a selected test voltage of test voltages 210 during this example test operation depending on the row and column location of image pixel 200 and based on a predefined pattern.

During testing, reset signal RST may be toggled to turn on both reset transistor 224 and anti-blooming transistor 204 simultaneously to allow VABDRAIN to be connected to photodiode 202 generating a test charge, and to allow floating diffusion node 222 to be reset to a voltage that is close to VAAPIX. After VAAPIX is connected to floating diffusion node 222 and VABDRAIN is connected to photodiode 202, reset signal RST may be toggled to turn off anti-blooming transistor 204 and reset transistor 224. However, the signal AB may instead be toggled independently from signal RST, (e.g., before or after RST is activated). After RST is toggled, a row select signal RS may be toggled allowing a reset voltage potential of floating diffusion node 222 to be read out from column output line 232 through source follower transistor 228 and row select transistor 230. After the reset voltage potential of floating diffusion node 222 is read out, a transfer signal TX may be toggled to activate transfer transistor 220 to transfer the test charge from photodiode 202 to floating diffusion node 222. After the test charge is passed to floating diffusion node 222, transfer transistor 220 may be turned off and RS may be toggled to read out the signal corresponding to test charge from column output line 232 through source follower transistor 228 and row select transistor 230. Both reset and test readout signals may be combined using a well-known CDS operation to determine the exact test signal level injected in the photodiodes.

After the test signal is read out for each pixel in the pixel array, verification circuitry associated with image sensor 14 may be used to make performance measurements of the pixel array. The performance measurements that are made may include detecting excessive leakage of photodiode 202 or floating diffusion node 222, incorrect pixel control voltages, incorrect row/column addressing, and analog readout path malfunction. The testing method above is highly insensitive to light because of the row-by-row methodology and timing described.

In an alternative test mode, anti-blooming transistor 204 may be kept off while voltage VABDRAIN is modulated to affect dark current. The operation of the alternative test mode may be similar to the test operation described above except the test charge injected into photodiode 202 results from dark current that is passed through anti-blooming transistor 204 while anti-blooming transistor 204 is off.

Figure 4:
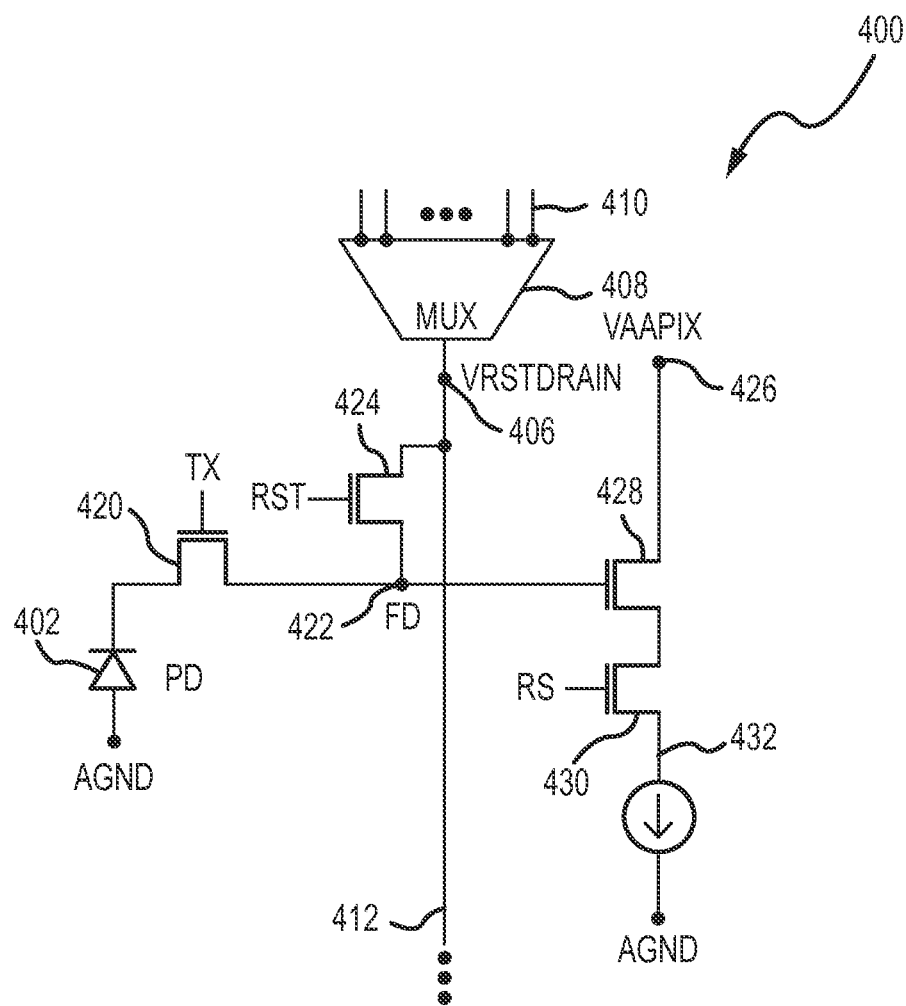
FIG. 4 is a diagram of an illustrative image pixel circuit with a photodiode that connects to a test signal line through a multiplexer through a transfer transistor and a reset transistor in accordance with an embodiment of the present invention.
Figure 5:
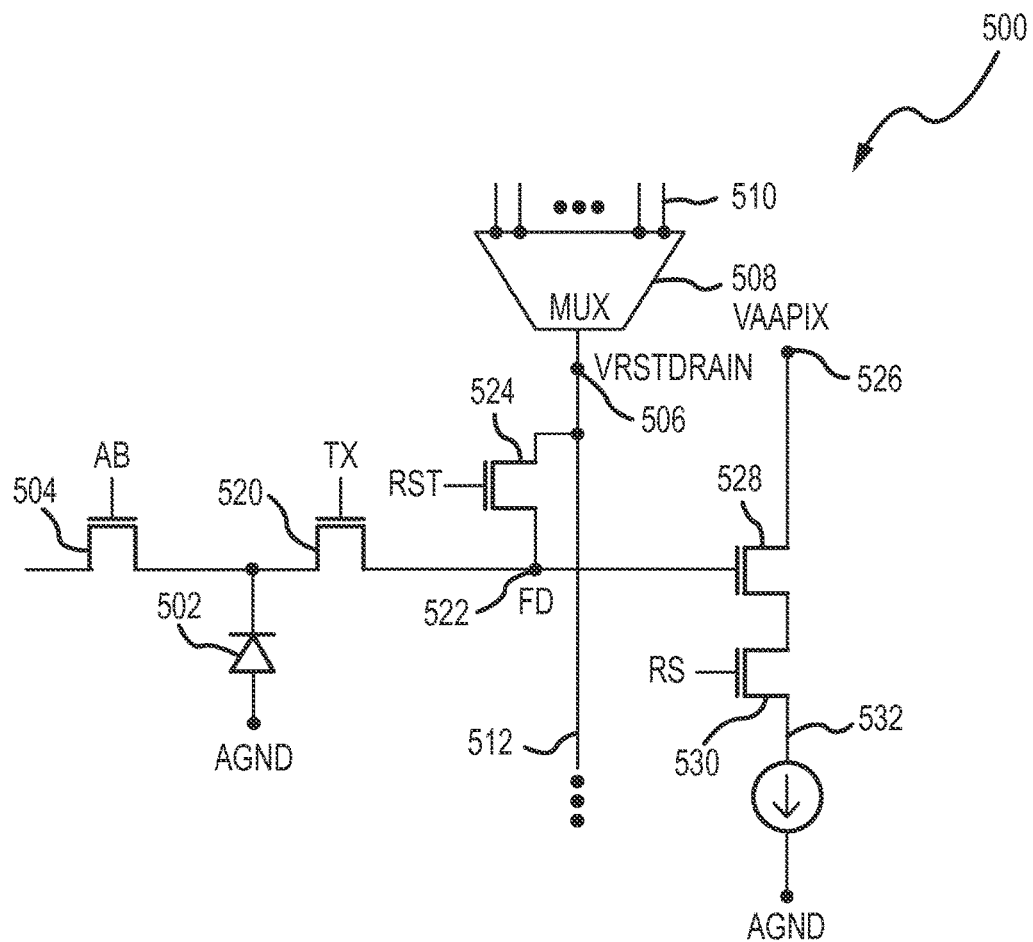
FIG. 5 is a diagram of an illustrative image pixel circuit with an anti-blooming transistor and a photodiode that connects to a test signal line through a multiplexer through a transfer transistor and a reset transistor in accordance with an embodiment of the present invention.

FIG. 3A-3D are diagrams of illustrative test patterns corresponding to the illustrative image pixel circuit shown in FIGS. 2, 4, and 5 in accordance with an embodiment. FIG. 3A shows a dark flat field test pattern 300 in which columns C1-C5 are all set to a test voltage corresponding to dark pixels 302 (e.g., VAAPIX in FIG. 2). FIG. 3B shows a first alternating column test pattern 310 in which columns C1, C3, and C5 that are set to a test voltage corresponding to dark pixels 312 (e.g., VAAPIX in FIG. 2) and columns C2 and C4 that are set to a test voltage corresponding to lighted pixels 314. FIG. 3C shows a second alternating column test pattern 320 in which columns C1, C3, and C5 are set to light test voltage 324 and columns C2 and C4 are set to a test voltage corresponding to dark pixels 322 (e.g., VAAPIX in FIG. 2). FIG. 3D shows a flat field test pattern 330 in which columns C1-C5 are all set to a test voltage corresponding to lighted pixels 334. It should be noted that these test patterns are merely illustrative and that other test patterns may be used including, but not limited to, a test image divided into light and dark halves across a diagonal of the test image, a test image that includes complex geometric shapes, an International Organization for Standardization (ISO) chart test image, text, and, for color image sensors, any color image. The application of ISO chart test patterns may be useful for differentiating image degradation due to lens effects from image degradation due to image processing effects.

The test patterns may be applied as a watermark to an image captured by an image sensor (e.g., image sensor 14)

by applying the test patterns to image sensor pixels during a light integration period. In this way, charge that is generated in selected image sensor pixels as a result of light integration may be combined with test pattern charges before being read out. This watermarking capability allows a user to incorporate a predefined image into a captured image that may be useful for identification and counterfeit prevention application.

Alternatively, the test patterns may be applied as an overlay to an image captured by an image sensor (e.g., image sensor 14) by applying the test patterns to image sensor pixels immediately after a light integration period, but before read-out operations. In this way, charge that is generated in selected image sensor pixels as a result of light integration may be replaced with test pattern charges before being read out. This overlay capability allows a user to add text or graphics to a captured image that are independent of the image. If desired, image sensor pixels within a given row may have shared control circuitry, such that overlay operations may be performed on entire rows, rather than individual pixels.

Many image sensors contain pixel arrays that have only one set of row control lines for each row of pixels. For this type of arrangement, overlay operations may be performed on entire rows rather than on individual pixels, although test data placed into each pixel can vary by column. For example, overlay data applied to pixels in a given row at the end of an integration period may overwrite all image data accumulated by pixels in that row.

In other image sensors, pixel arrays may have control circuitry that is configured to control each pixel in a given row individually. In these types of arrangements, real image data may be selectively retained in some pixels in a row while image data in other pixels in the row may be overwritten with overlay data at the end of the integration period.

FIG. 4 is a diagram of an illustrative image pixel circuit with a photodiode that connects to a test signal line through a multiplexer through a transfer transistor and a reset transistor in accordance with an embodiment. As shown in FIG. 4, image pixel 400 may be part of a pixel array arranged in rows and columns and may include a photodiode (PD) 402, a column multiplexer 408, a transfer transistor 420, a floating diffusion (FD) node 422, a reset transistor 424, a source follower transistor 428, a row select transistor 430, and a column output line 432. Floating diffusion node 422 may be coupled to photodiode 402 through transfer transistor 420. Source follower transistor 428 may have a drain terminal that is connected to a pixel voltage supply that generates a pixel voltage VAAPIX at pixel voltage node 426, a gate terminal that is connected to floating diffusion node 422, and a source terminal that is coupled to column output line 432 through row select transistor 430.

Column multiplexer 408 may receive test signals 410 and may pass a selected test voltage of test voltages 410 to multiplexer output node 406 that is coupled to photodiode 402 through reset transistor 424 and transfer transistor 420. Multiplexer output node 406 may have a voltage VRSTDRAIN and may be connected to multiple pixels in a single column of the pixel array. Each row in the pixel array may be read out separately using an ERS operation. Because each row is read out separately and each column can be individually controlled with column multiplexer 408, each pixel in the pixel array may receive a unique test signal.

During normal operation, column multiplexer 408 may select VRSTDRAIN to have the same voltage level as VAAPIX. The gate terminal of reset transistor 424 may be configured to receive a reset signal RST. The gate terminal of transfer transistor 420 may be configured to receive a transfer signal TX. The gate terminal of row select transistor 430 may be configured to receive a row select signal RS. VRSTDRAIN may be set to a selected test voltage of test voltages 410 during this example test operation depending on the row and column location of image pixel 400 and based on predefined pattern.

During testing, reset signal RST and transfer signal TX may be simultaneously toggled to turn on reset transistor 424 and transfer transistor 420 to allow VRSTDRAIN to be connected to photodiode 402 to generate a test charge. After the test charge is generated by photodiode 402, reset signal RST may be toggled to turn off transfer transistor 420 and reset transistor 424. After RST is toggled, column multiplexer 408 may be used to set VRSTDRAIN equal to VAAPIX. After VRSTDRAIN is set to VAAPIX, reset signal RST may be toggled to connect VRSTDRAIN to floating diffusion node 422. After floating diffusion node 422 is reset to a reset voltage potential close to VRSTDRAIN, a row select signal RS may be toggled allowing the reset voltage potential of floating diffusion node 422 to be read out from column output line 432 through source follower transistor 428 and row select transistor 430.

After the reset voltage potential of floating diffusion node 422 is read out, transfer signal TX may be toggled to activate transfer transistor 420 to transfer the test charge from photodiode 402 to floating diffusion node 422. After the test charge is passed to floating diffusion node 422, transfer transistor 420 may be turned off and RS may be toggled to read out the voltage potential corresponding to the test charge from column output 432 line through source follower transistor 428 and row select transistor 430. After the voltage potential corresponding to the test charge is read out for each pixel in the pixel array, both read-out reset and test signals may be combined using a well-known CDS operation determine the exact test signal level injected in the photodiodes.

After the test signal is readout, performance verification circuitry may be used to make performance measurements of the pixel array. The performance measurements that are made may include excessive leakage of photodiode 402 or floating diffusion node 422, incorrect pixel control voltages, incorrect row/column addressing, and analog readout path malfunction.

In an alternate test mode for injecting a test pattern directly into floating diffusion node 422 and not into photodiode 402, VRSTDRAIN may be set equal to VAAPIX. During testing, reset signal RST may be toggled to connect VRSTDRAIN to floating diffusion node 422. After VRSTDRAIN is connected to floating diffusion node 422, row select signal RS may be toggled allowing a reset voltage potential of floating diffusion node 422 to be read out from column output line 432 through source follower transistor 428 and row select transistor 430. After the reset voltage potential of floating diffusion node is read out, column multiplexer 408 may be used to set VRSTDRAIN equal to a selected test voltage of test voltages 410 depending on the row and column location of image pixel 400 and based on a predefined pattern. After VRSTDRAIN is set to the selected test voltage, reset signal RST may be toggled to connect the test voltage to floating diffusion node 422. After the test voltage sets the floating diffusion node 422 to a test voltage potential, a row select signal RS may be toggled allowing the test voltage level to be read out from column output line 432 through source follower transistor 428 and row select transistor 430. Both read out reset and test signals may be combined using a well-known CDS operation to determine the exact test signal level set in floating diffusion node 422.

After the test voltage is read out for each pixel in the pixel array, performance verification circuitry may be used to make performance measurements of the pixel array. The test method for applying a test pattern directly to the floating diffusion node is advantageous because it is completely insensitive to light, although it does not allow for the testing of photodiode 402 and transfer gate 420. The test patterns described in connection with FIGS. 3A-3D may also be applied to image pixel circuit 400.

FIG. 5 is a diagram of an illustrative image pixel circuit with an anti-blooming transistor and a photodiode that connects to a test signal line through a multiplexer through a transfer transistor and a reset transistor in accordance with an embodiment. As shown in FIG. 5, image pixel 500 may be part of a pixel array arranged in rows and columns and may include a photodiode (PD) 502, an anti-blooming transistor 504, a column multiplexer 508, a transfer transistor 520, a floating diffusion (FD) node 522, a reset transistor 524, a source follower transistor 528, a row select transistor 530, and a column output line 532. Floating diffusion node 522 may be coupled to photodiode 502 through transfer transistor 520. Anti-blooming transistor 504 may have a source terminal that is connected to the photodiode. Source follower transistor 528 may have a drain terminal that is connected to a pixel voltage supply that generates a pixel voltage VAAPIX at pixel voltage node 526, a gate terminal that is connected to floating diffusion node 522, and a source terminal that is coupled to column output line 532 through row select transistor 530.

Column multiplexer 508 may receive test signals 510 and may pass a selected test voltage of test voltages 510 to photodiode 502 through multiplexer output node 506, reset transistor 524 and transfer transistor 520. Multiplexer output node 506 may have a voltage VRSTDRAIN and may be connected to multiple pixels in a single column of the pixel array. Each row in the pixel array may be read out separately using an ERS operation. Because each row is read out separately and each column can be individually controlled with column multiplexer 508, each pixel in the pixel array may receive a unique test signal.

Testing operations of the image pixel circuit 500 may be similar to those described in connection with image pixel circuit 400 in FIG. 4. Image pixel circuit 500 may be operated in LFM (LED Flicker Mitigation) mode due to the addition of anti-blooming transistor 504. LED Flicker Mitigation operations are described in U.S. patent application No. 20150009375 A1, filed Aug. 28, 2013, which is hereby incorporated by reference herein in its entirety. The test patterns described in connection with FIGS. 3A-3D may also be applied to image pixel circuit 500.

It should be noted that while the embodiments described in connection with FIGS. 2, 4, and 5 entail testing all pixels in an image sensor, other embodiments may be employed in which only selected pixels in an image sensor are used for testing. Testing only some of the pixels in an image sensor may provide system feedback about average pixel performance while using fewer resources than embodiments in which all pixels in an image sensor are tested.

It should be noted that the multiplexers used in the embodiments shown in FIGS. 2, 4, and 5 may be substituted to other test signal generating circuits that provide test signals for VABDRAIN or VRSTDRAIN lines. Examples of such circuitries may include Digital-to-Analog (DAC) converters.

Figure 6:
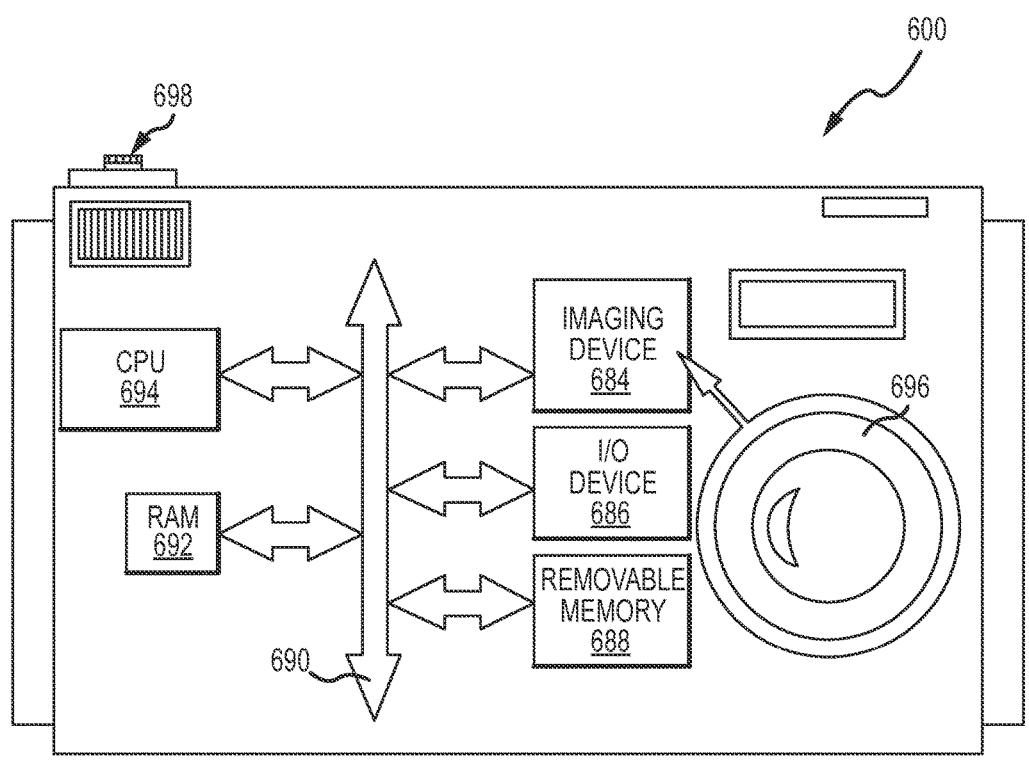
FIG. 6 is a block diagram of a processor system that may include pixel circuitry of the type shown in FIGS. 2, 4, and 5 in accordance with an embodiment of the present invention.

FIG. 6 is a block diagram of a processor system employing the image pixel circuit of FIGS. 2, 4, and 5 in accordance with an embodiment. Device 684 may comprise the elements of device 10 (FIG. 1) or any relevant subset of the elements. Processor system 600 is exemplary of a system having digital circuits that could include imaging device 684. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 600, which may be a digital still or video camera system, may include a lens or multiple lenses indicated by lens 696 for focusing an image onto an image sensor, image sensor array, or multiple image sensor arrays such as image sensor 16 (FIG. 1) when shutter release button 698 is pressed. Processor system 600 may include a central processing unit such as central processing unit (CPU) 694. CPU 694 may be a microprocessor that controls camera functions and one or more image flow functions and communicates with one or more input/output (I/O) devices 686 over a bus such as bus 690. Imaging device 684 may also communicate with CPU 694 over bus 690. System 600 may include random access memory (RAM) 692 and removable memory 688. Removable memory 688 may include flash memory that communicates with CPU 694 over bus 690. Imaging device 684 may be combined with CPU 694, with or without memory storage, on a single integrated circuit or on a different chip. Although bus 690 is illustrated as a single bus, it may be one or more buses or bridges or other communication paths used to interconnect the system components.

Various embodiments have been described illustrating an imaging system (e.g., system 100 of FIG. 1) including an imaging system and host subsystems. An imaging system may include one or more image sensors. Each image sensor may include an array of image pixels. Each image pixel may include one or more photosensitive elements configured to convert incoming light into electric charge.

Each image sensor may include an array of pixels arranged in rows and columns. At least one column test signal generator that generates multiple test signals may be coupled to each pixel in an associated one of the columns. The test signal generator may be a multiplexer and/or a digital-to-analog converter. The at least one column test signal generator may provide test voltages to pixels in the pixel array via test voltage lines that are selected based on the row location and the column location of each pixel in the array and based on a predefined test pattern. The predefined test pattern may be chosen from a group consisting of: uniform pixel values, alternating dark and light groups of columns, and complex geometric shapes. Each column may include a transfer transistor, and a photodiode coupled to the transfer transistor. The at least one column test signal generator may be coupled to the photodiode through the second transistor.

According to one example, an anti-blooming transistor may be coupled between the photodiode and the at least one column test signal generator. A floating diffusion node may be coupled to the photodiode through the transfer transistor. A reset transistor may be coupled to the floating diffusion node. A source follower transistor may have a gate that is coupled to the floating diffusion node. The reset transistor and the source follower transistor may be configured to receive a pixel voltage. A row select transistor may be coupled to the source follower transistor.

The floating diffusion node may be set to a reset voltage while the column provides a selected test voltage that generates a test charge in the photodiode through the anti-blooming transistor. The reset voltage may be read out from the floating diffusion node by activating the source follower transistor and the row select transistor. The test charge may be transferred from the photodiode to the floating diffusion node by activating the transfer transistor. The source-follower transistor and the row select transistor may be activated to read out a voltage that corresponds to the test charge from the floating diffusion node. Readout operations may be performed in rolling shutter mode.

According to another example, a floating diffusion node may be coupled to the photodiode through the transfer transistor. The at least one column test signal generator may be coupled to the floating diffusion node through a reset transistor. A source follower transistor may have a gate that is coupled to the floating diffusion node and a drain that is coupled to a pixel voltage line. A row select transistor may be coupled to the source follower transistor. The pixel voltage line may be separate from the at least one column test signal generator. An anti-blooming transistor may be coupled to the photodiode.

The photodiode may accumulate a test charge upon connecting to a selected test voltage line via the at least one column test signal generator while the transfer transistor and the reset transistor are active. The floating diffusion node may receive a reset voltage from the at least one column test signal generator while the reset transistor is active. The source follower and row select transistors may be activated to read out the reset voltage. The test charge may be transferred from the photodiode to the floating diffusion node by activating the transfer transistor. The source-follower transistor and the row select transistor may be activated to read out a voltage that corresponds to the test charge from the floating diffusion node. Read-out may be performed in a rolling shutter operation.

According to another example, a test charge injected into photodiode may remain in the photodiode without being reset for the entire pixel integration and read-out and may be read out during an ERS read-out operation in addition to any light generated charge that may accumulate in the photodiode. This mode of operation may provide identifying watermarking information to a captured image that may be text, graphics, or a combination of text and graphics and that is combined with the original image data, similar to watermarks on printed paper.

According to another example, photodiode light integrated charge may be flashed for specific pixels during an ERS readout operation and a test charge may be injected into the photodiodes in order to replace charge that has accumulated in the photodiodes, similar to the watermarking operation described previously. This type of operation may provide an acquired image with overlaid test image that replaces the original image data and that may be text or some other graphics or combination of both text and graphics.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor having an array of pixels arranged in rows and columns and having at least one column test signal generator coupled to each pixel in an associated one of the columns, wherein each pixel in the column comprises:
    a first transistor;
    a second transistor;
    a photodiode coupled between the first and second transistors, wherein the first transistor is directly coupled to the photodiode, wherein the second transistor is directly coupled to the photodiode, wherein the column test signal generator comprises a multiplexer having test signal inputs that is coupled to the photodiode through the second transistor, and wherein the multiplexer is directly coupled to the second transistor; and
    a floating diffusion node, wherein the first transistor is coupled between the floating diffusion node and the photodiode.

2. The image sensor defined in claim 1, wherein each pixel in the column further comprises:
    a reset transistor coupled to the floating diffusion node; and
    a source follower transistor having a gate that is coupled to the floating diffusion node.

3. The image sensor defined in claim 2, wherein the reset transistor and the source follower transistor receive a pixel voltage.

4. The image sensor defined in claim 2, further comprising:
    a row select transistor coupled to the source follower transistor.

5. The image sensor defined in claim 1, wherein the at least one column test signal generator provides a selected test voltage to the photodiode through the second transistor based on a predefined pattern and based on a row and a column in which each pixel is located.

6. An image sensor having an array of pixels arranged in rows and columns and having at least one column test signal generator coupled to each pixel in an associated one of the columns, wherein each pixel in the column comprises:
    a first transistor coupled to a node;
    a second transistor coupled to the node;
    a photodiode coupled to the node, wherein the node is interposed between the first and second transistors, wherein the column test signal generator comprises a multiplexer having test signal inputs that is coupled to the photodiode through the second transistor and the node; and
    a floating diffusion node, wherein the first transistor is coupled between the floating diffusion node and the node.

7. The image sensor defined in claim 6, wherein each pixel in the column further comprises:
    a reset transistor coupled to the floating diffusion node; and
    a source follower transistor having a gate that is coupled to the floating diffusion node.

8. The image sensor defined in claim 6, wherein the at least one column test signal generator provides a selected test voltage to the photodiode through the second transistor based on a predefined pattern and based on a row and a column in which each pixel is located.

9. An image sensor having an array of pixels arranged in rows and columns and having at least one column test signal generator coupled to each pixel in an associated one of the columns, wherein each pixel in the column comprises:
    a first transistor;
    a second transistor;
    a photodiode coupled to a node that is interposed between the first and second transistors, wherein the column test signal generator comprises a multiplexer having test signal inputs that is coupled to the photodiode through the second transistor and wherein the second transistor is the only transistor interposed between the photodiode and the multiplexer; and a floating diffusion node, wherein the first transistor is coupled between the floating diffusion node and the node.

10. The image sensor defined in claim 9, wherein each pixel in the column further comprises:
a reset transistor coupled to the floating diffusion node; and
a source follower transistor having a gate that is coupled to the floating diffusion node.

11. The image sensor defined in claim 9, wherein the at least one column test signal generator provides a selected test voltage to the photodiode through the second transistor based on a predefined pattern and based on a row and a column in which each pixel is located.

12. The image sensor defined in claim 9, wherein each pixel in the column further comprises:
a reset transistor coupled to the floating diffusion node;
a source follower transistor having a gate that is coupled to the floating diffusion node, wherein the reset transistor and the source follower transistor receive a pixel voltage; and
a row select transistor coupled to the source follower transistor, wherein the at least one column test signal generator provides a selected test voltage to the photodiode through the second transistor based on a predefined pattern and based on a row and a column in which each pixel is located.

13. The image sensor defined in claim 6, wherein each pixel in the column further comprises:
a reset transistor coupled to the floating diffusion node;
a source follower transistor having a gate that is coupled to the floating diffusion node, wherein the reset transistor and the source follower transistor receive a pixel voltage; and
a row select transistor coupled to the source follower transistor, wherein the at least one column test signal generator provides a selected test voltage to the photodiode through the second transistor based on a predefined pattern and based on a row and a column in which each pixel is located.

14. The image sensor defined in claim 1, wherein each pixel in the column further comprises:
a reset transistor coupled to the floating diffusion node;
a source follower transistor having a gate that is coupled to the floating diffusion node, wherein the reset transistor and the source follower transistor receive a pixel voltage; and
a row select transistor coupled to the source follower transistor, wherein the at least one column test signal generator provides a selected test voltage to the photodiode through the second transistor based on a predefined pattern and based on a row and a column in which each pixel is located.

15. The image sensor defined in claim 1, wherein each pixel in the column further comprises:
readout circuitry coupled to the floating diffusion node.

16. The image sensor defined in claim 15, wherein the at least one column test signal generator provides a selected test voltage to the photodiode through the second transistor based on a predefined pattern and based on a row and a column in which each pixel is located.

* * * * *